United States Patent
Geng et al.

(10) Patent No.: US 12,452,837 B2
(45) Date of Patent: Oct. 21, 2025

(54) COMMUNICATION METHOD AND APPARATUS

(71) Applicant: HUAWEI TECHNOLOGIES CO., LTD., Shenzhen (CN)

(72) Inventors: Tingting Geng, Shanghai (CN); Yedan Wu, Shanghai (CN); Le Yan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 410 days.

(21) Appl. No.: 17/994,567

(22) Filed: Nov. 28, 2022

(65) Prior Publication Data

US 2023/0093240 A1    Mar. 23, 2023

Related U.S. Application Data

(63) Continuation of application No. PCT/CN2021/094897, filed on May 20, 2021.

(30) Foreign Application Priority Data

May 29, 2020 (CN) .......................... 202010472766.5

(51) Int. Cl.
*H04W 68/02* (2009.01)
*H04W 8/24* (2009.01)

(52) U.S. Cl.
CPC .............. *H04W 68/02* (2013.01); *H04W 8/24* (2013.01)

(58) Field of Classification Search
CPC ..... H04W 68/02; H04W 8/24; H04W 68/005; H04W 68/00; H04W 76/27; H04B 7/18563

(Continued)

(56) References Cited

U.S. PATENT DOCUMENTS

2020/0245290 A1* 7/2020 Jiang ...................... H04W 68/02
2021/0321357 A1* 10/2021 Shrestha ............. H04W 68/005
(Continued)

FOREIGN PATENT DOCUMENTS

| CN | 110972257 A | 4/2020 |
| WO | 2016082147 A1 | 6/2016 |
| WO | 2019075659 A1 | 4/2019 |

OTHER PUBLICATIONS

ZTE, Sanechips, Tracking Area Management and Paging Handling in NTN. 3GPP TSG RAN WG3#103, Athens, Greece, Feb. 25-Mar. 1, 2019, R3-190139, 15 pages.
(Continued)

*Primary Examiner* — Hirdepal Singh
(74) *Attorney, Agent, or Firm* — HAUPTMAN HAM, LLP

(57) ABSTRACT

A communication method and apparatus are provided, where the method includes: A first network device generates and sends a paging message to a second network device. The paging message is used to page a terminal device, the paging message includes first indication information, and the first indication information indicates that a paging range includes a non-terrestrial network NTN cell and/or a terrestrial network TN cell. By applying the foregoing technical solution, the network device may determine an appropriate paging area based on a type of the terminal device or capability information of the terminal device, to avoid sending the paging message in an area that is not supported by the terminal device, so that overheads of paging signaling are effectively reduced.

15 Claims, 7 Drawing Sheets

(58) Field of Classification Search
USPC .......................................................... 455/458
See application file for complete search history.

(56) References Cited

U.S. PATENT DOCUMENTS

| | | | |
|---|---|---|---|
| 2021/0377825 A1* | 12/2021 | Deenoo | H04B 7/1851 |
| 2022/0086713 A1* | 3/2022 | Määttänen | H04W 36/00837 |
| 2022/0104175 A1* | 3/2022 | Wei | H04B 7/18508 |
| 2022/0240213 A1* | 7/2022 | Ly | H04W 48/18 |

OTHER PUBLICATIONS

3GPP TS 38.304 V16.0.0 (Mar. 2020), 3rd Generation Partnership Project; Technical Specification Group Radio Access Network; NR; User Equipment (UE) procedures in Idle mode and RRC Inactive state(Release 16), 38 pages.

LG Electronics Inc., Discussion on the Issue for paging in NTN. 3GPP TSG-RAN WG2#104, Spokane, USA, Nov. 12-16, 2018, R2-1816447, 5 pages.

3GPP TS 36.304 V16.0.0 (Mar. 2020), 3rd Generation Partnership Project; Technical Specification Group Radio Access Network; Evolved Universal Terrestrial Radio Access (E-UTRA); User Equipment (UE) procedures in idle mode (Release 16), 58 pages.

ZTE, Sanechips, Discussion on Network Identities in NTN. 3GPP TSG-RAN WG2 #103bis, Chengdu, China, Oct. 8-12, 2018, R2-1814244, 5 pages.

International Search Report issued in corresponding International Application No. PCT/CN2021/094897, dated Aug. 18, 2021, pp. 1-9.

Chinese Office Action issued in corresponding Chinese Application No. 202010472766.5, dated Feb. 18, 2025, pp. 1-7.

* cited by examiner

COMMUNICATION METHOD AND APPARATUS

CROSS-REFERENCE TO RELATED APPLICATION

This application is a continuation of International Application No. PCT/CN2021/094897, filed on May 20, 2021, which claims priority to Chinese Patent Application No. 202010472766.5, filed on May 29, 2020. The disclosures of the aforementioned applications are hereby incorporated by reference in their entireties.

TECHNICAL FIELD

This application relates to the field of wireless communication technologies, and in particular, to a communication method and apparatus.

BACKGROUND

When a terminal device is in a radio resource control (RRC)_IDLE (IDLE) mode or an RRC_INACTIVE (INACTIVE) mode, a connection between the terminal device and an access network device is in a disconnected state. In this case, if a network side needs to send data to the terminal device, the network side contacts the terminal device via a paging message. After receiving the paging message, the terminal device establishes a connection to the access network device to transmit the data.

In an existing paging mechanism, for a terminal device in the RRC_IDLE mode, a core network device may send, based on a tracking area (TA) list of the terminal device, paging messages to all access network devices included in the TA list, and the access network devices page the terminal device in cells managed by the access network devices. Similarly, for a terminal device in the RRC_INACTIVE mode, when downlink data of the terminal device arrives, a core network device may directly send the data to an anchor access network device of the terminal device. The anchor access network device may send, based on radio access network notification area (RNA) information of the terminal device, paging messages to all access network devices included in an RNA, and the access network devices page the terminal device in cells managed by the access network devices.

In a hybrid deployment scenario of a non-terrestrial network (NTN) and a terrestrial network (TN), an NTN cell and a TN cell may have same cell configuration parameters, for example, have a same tracking area code (TAC) or a same radio access network area code (RANAC). In this scenario, the NTN cell and the TN cell cannot be distinguished in the existing paging mechanism, and undifferentiated paging is performed in cells included in a TA or the RNA, which may cause unnecessary paging signaling overheads.

SUMMARY

A communication method and apparatus in embodiments of this application are used to provide a paging mechanism in a hybrid deployment scenario of an NTN network and a TN network, to reduce paging signaling overheads and improve paging efficiency.

According to a first aspect, an embodiment of this application provides a communication method. The method may be performed by a first network device, or may be performed by a component (for example, a chip or a circuit) configured in the first network device.

In the following descriptions of this application, an example in which the first network device performs the method is used for description. The method may include: The first network device generates a paging message, where the paging message is used to page a terminal device, the paging message includes first indication information, and the first indication information indicates that a paging range includes a non-terrestrial network NTN cell and/or a terrestrial network TN cell. The first network device sends the paging message to a second network device.

By applying the foregoing technical solution, the network device may determine an appropriate paging area based on the paging range, where the paging area may be determined based on type information of the terminal device or capability information of the terminal device, to avoid sending the paging message in an area that is not supported by the terminal device, so that overheads of paging signaling are effectively reduced.

In a possible design of the first aspect, when the first indication information indicates that the paging range includes the NTN cell, the first indication information may further indicate that the paging range includes one or more of a geostationary earth orbit GEO satellite cell, a low earth orbit LEO satellite cell, or a high altitude platform station HAPS cell.

In a possible design of the first aspect, the method may further include: The first network device obtains capability information of the terminal device, where the capability information is used to determine whether the terminal device supports the NTN cell and/or the TN cell. In this way, when initiating paging for the terminal device, the first network device determines the appropriate paging area based on the capability information of the terminal device.

In a possible design of the first aspect, if the terminal device supports the NTN cell, the capability information may be further used to determine that the terminal device supports one or more of the GEO satellite cell, the LEO satellite cell, or the HAPS cell.

In a possible design of the first aspect, the first network device may further send second indication information to the terminal device, where the second indication information indicates that an area range to which paging configuration information is applicable includes the NTN cell and/or the TN cell. The paging configuration information may be tracking area TA information or radio access network notification RNA information.

By applying the foregoing technical solution, the network device configures, for the terminal device, the corresponding area range to which the paging configuration information is applicable. In this way, when the terminal device moves out of the area range to which the paging configuration information is applicable, the terminal device may trigger tracking area update (TAU) or radio access network-based notification area update (RNAU) in a timely manner, so that the network device can learn of location information of the terminal device in a timely manner and perform corresponding location management.

In a possible design of the first aspect, when the first indication information indicates that the area range to which the paging configuration information is applicable includes the NTN cell, the second indication information may further indicate that the area range to which the paging configuration information is applicable includes one or more of the GEO satellite cell, the LEO satellite cell, or the HAPS cell.

In a possible design of the first aspect, the first network device may be a core network device, and the second network device may be an access network device. Alternatively, both the first network device and the second network device may be access network devices.

It can be learned that embodiments of this application are applicable to a scenario in which a core network device initiates paging (that is, CN paging), and is also applicable to a scenario in which an access network device initiates paging (that is, RAN paging).

In a possible design of the first aspect, if both the first network device and the second network device are access network devices, the method may further include: The first network device receives a context request message from the second network device, where the context request message is used to request a context of the terminal device. The first network device sends a context response message to the second network device, where the context response message includes the capability information of the terminal device. The first network device is an anchor access network device of the terminal device, and the second network device is another access network device that finds the terminal device through paging.

By applying this technical solution, after the second network device finds the terminal device through paging, the second network device may obtain the capability information of the terminal device in the foregoing manner, to learn of whether the terminal device supports the NTN and the TN, so that the second network device better serves the terminal device.

According to a second aspect, an embodiment of this application provides a communication method. The method may be performed by a second network device, or may be performed by a component (for example, a chip or a circuit) configured in the second network device. In the following descriptions of this application, an example in which the second network device performs the method is used for description. The method may include: The second network device receives a paging message from a first network device, where the paging message is used to page a terminal device, the paging message includes first indication information, and the first indication information indicates that a paging range includes a non-terrestrial network NTN cell and/or a terrestrial network TN cell. The second network device determines, based on the first indication information, a cell in which the terminal device is to be paged.

In a possible design of the second aspect, when the first indication information indicates that the paging range includes the NTN cell, the first indication information may further indicate that the paging range includes one or more of a geostationary earth orbit GEO satellite cell, a low earth orbit LEO satellite cell, or a high altitude platform station HAPS cell.

In a possible design of the second aspect, the first network device may be a core network device, and the second network device may be an access network device. Alternatively, both the first network device and the second network device may be access network devices.

In a possible design of the second aspect, if both the first network device and the second network device may be access network devices, the method may further include: The second network device sends a context request message to the first network device, where the context request message is used to request a context of the terminal device. The second network device receives a context response message from the first network device, where the context response message includes capability information of the terminal device. The first network device is an anchor access network device of the terminal device, and the second network device is another access network device that finds the terminal device through paging.

According to a third aspect, an embodiment of this application provides a communication apparatus. The apparatus has functions of implementing functions of the first network device in the first aspect or any one of the possible designs of the first aspect, or has functions of implementing functions of the second network device in the second aspect or any one of the possible designs of the second aspect. The apparatus may be a network device, or may be a chip included in a network device.

The functions of the communication apparatus may be implemented by hardware, or may be implemented by hardware executing corresponding software. The hardware or the software includes one or more modules, units, or means corresponding to the functions.

In a possible design, a structure of the apparatus may include a processing module and a transceiver module. The processing module is configured to support the apparatus in performing the corresponding functions of the first network device in the first aspect or any design of the first aspect, or performing the corresponding functions of the second network device in the second aspect or any design of the second aspect. The transceiver module is configured to support communication between the apparatus and another communication device. For example, when the apparatus is a first network device, the apparatus may send a paging message to a second network device. The communication apparatus may further include a storage module. The storage module is coupled to the processing module, and stores program instructions and data that are necessary for the apparatus. In an example, the processing module may be a processor, a communication module may be a transceiver, and the storage module may be a memory. The memory may be integrated with the processor, or may be separate from the processor. This is not limited in this application.

In another possible design, a structure of the apparatus includes a processor, and may further include a memory. The processor is coupled to the memory, and may be configured to execute computer program instructions stored in the memory, so that the apparatus performs the method in the first aspect or any one of the possible designs of the first aspect, or performs the method in the second aspect or any one of the possible designs of the second aspect. Optionally, the apparatus further includes a communication interface, and the processor is coupled to the communication interface. When the apparatus is the network device or a terminal device, the communication interface may be a transceiver or an input/output interface. When the apparatus is the chip included in the network device, the communication interface may be an input/output interface of the chip. Optionally, the transceiver may be a transceiver circuit, and the input/output interface may be an input/output circuit.

According to a fourth aspect, an embodiment of this application provides a chip system, including a processor. The processor is coupled to a memory. The memory is configured to store a program or instructions. When the program or the instructions are executed by the processor, the chip system is enabled to implement the method in the first aspect or any one of the possible designs of the first aspect, or implement the method in the second aspect or any one of the possible designs of the second aspect.

Optionally, the chip system further includes an interface circuit, and the interface circuit is configured to exchange code instructions to the processor.

Optionally, there may be one or more processors in the chip system, and the processor may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be separate from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a fifth aspect, an embodiment of this application provides a computer-readable storage medium, storing a computer program or instructions. When the program or the instructions are executed, a computer is enabled to implement the method in the first aspect or any one of the possible designs of the first aspect, or implement the method in the second aspect or any one of the possible designs of the second aspect.

According to a sixth aspect, an embodiment of this application provides a computer program product. When a computer reads and executes the computer program product, the computer is enabled to implement the method in the first aspect or any one of the possible designs of the first aspect, or implement the method in the second aspect or any one of the possible designs of the second aspect.

According to a seventh aspect, an embodiment of this application provides a communication system. The communication system includes a first network device, a second network device, and at least one terminal device. Optionally, the communication system may further include a core network device.

For beneficial effects in the second aspect to the seventh aspect and various possible designs in the second aspect to the seventh aspect, refer to corresponding descriptions in the first aspect. Details are not described herein again.

DESCRIPTION OF EMBODIMENTS

To make objectives, technical solution, and advantages of embodiments of this application clearer, the following further describes embodiments of this application in detail with reference to the accompanying drawings.

Technical solution in embodiments of this application may be applied to various communication systems, for example, a global system for mobile communications (GSM) system, a code division multiple access (CDMA) system, a wideband code division multiple access (WCDMA) system, a general packet radio service (GPRS) system, an LTE system, an LTE frequency division duplex (FDD) system, an LTE time division duplex (TDD) system, a universal mobile telecommunications system (UMTS), a worldwide interoperability for microwave access (WIMAX) communication system, or a fifth generation (5th generation, 5G) system or an NR system. Alternatively, the technical solution in embodiments of this application may be applied to a future communication system, another similar communication system, or the like.

Figure 1:
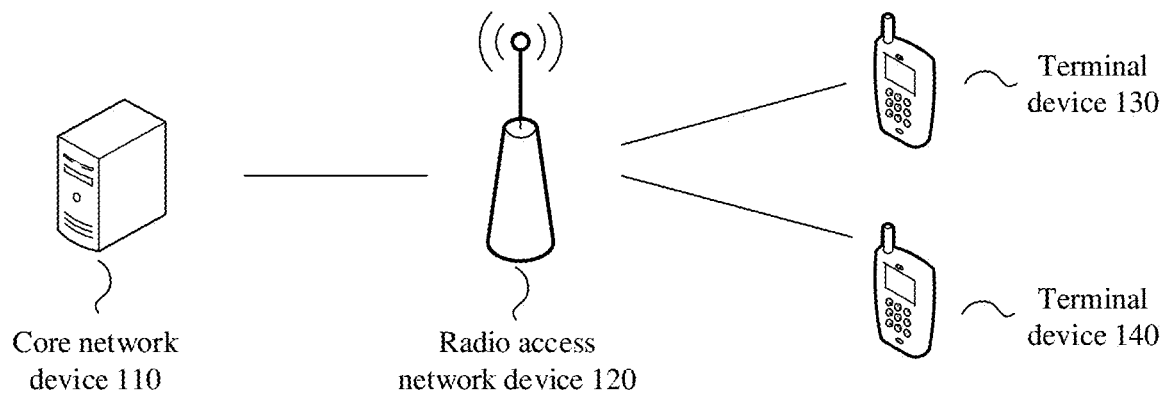
FIG. 1 is a schematic diagram of a network architecture of a communication system to which an embodiment of this application is applicable.

FIG. 1 is a schematic diagram of a network architecture of a communication system to which an embodiment of this application is applicable. The network architecture includes a core network device 110, a radio access network device 120, and at least one terminal device (for example, terminal devices 130 and 140 shown in FIG. 1).

The terminal device may be connected to the radio access network device in a wireless manner. The radio access network device is connected to the core network device in a wireless or wired manner. The core network device and the radio access network device may be independent and different physical devices, or a function of the core network device and a logical function of the radio access network device may be integrated into a same physical device, or a part of functions of the core network device and a part of functions of the radio access network device may be integrated into one physical device.

It should be understood that FIG. 1 that shows the communication system is merely a schematic diagram. The communication system may further include another type of network device, for example, a wireless relay device or a wireless backhaul device, which is not drawn in FIG. 1. It should be understood that quantities of core network devices, radio access network devices, terminal devices, and wireless backhaul devices included in the communication system are not limited in embodiments of this application.

The radio access network device mentioned in embodiments of this application may correspond to different devices in different communication systems. For example, in a 5G system, the radio access network device corresponds to an access network device such as a gNB in 5G; in a 4G system, the radio access network device corresponds to an access network device such as an eNB in 4G.

Communication between the radio access network device and the terminal device and communication between the terminal devices may be performed through a licensed spectrum, may be performed through an unlicensed spectrum, or may be performed through both a licensed spectrum and an unlicensed spectrum. Communication between the radio access network device and the terminal device and communication between the terminal devices may be performed through a spectrum below 6 gigahertz (GHz), through a spectrum above 6 GHz, or through both a spectrum below 6 GHz and a spectrum above 6 GHz. A spectrum resource used between the radio access network device and the terminal device is not limited in embodiments of this application.

Embodiments of this application are applicable to a hybrid deployment scenario of an NTN and a TN. The NTN may include a satellite communication system, a high altitude platform station (HAPS) communication system, or another non-terrestrial communication system.

Figure 2:
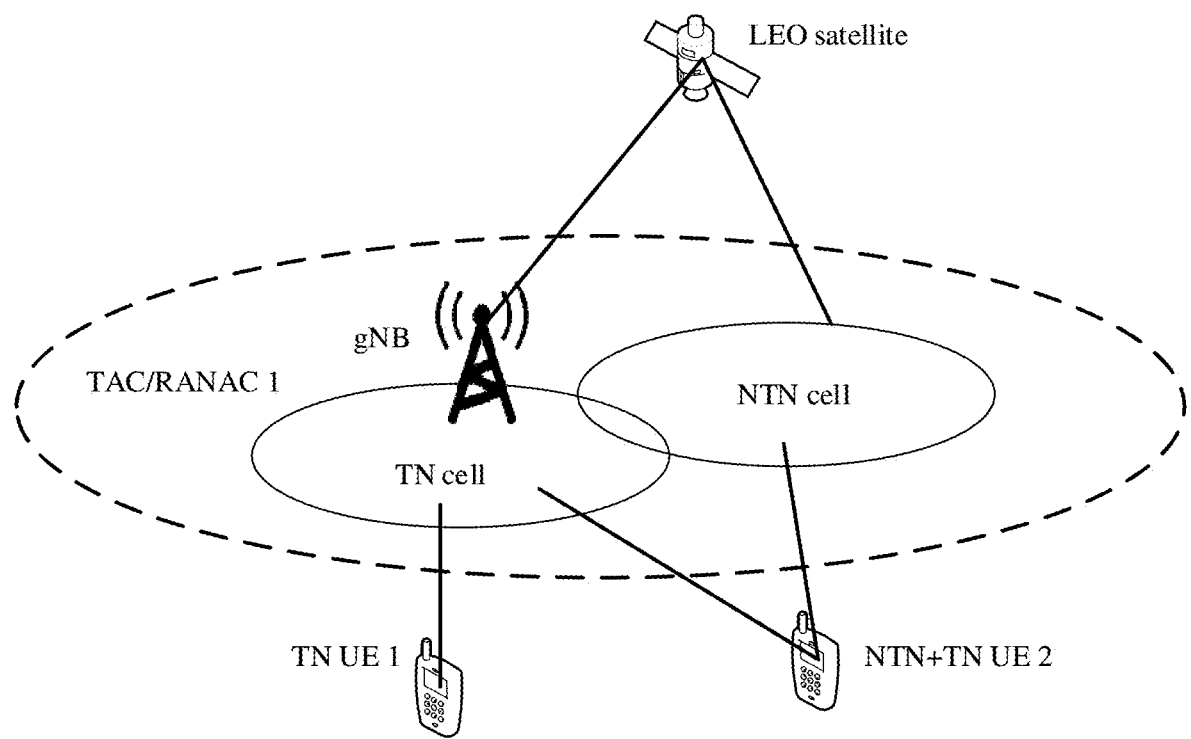
FIG. 2 is a schematic diagram of a hybrid deployment scenario of an NTN and a TN to which an embodiment of this application is applicable.

FIG. 2 is a schematic diagram of a hybrid deployment scenario of an NTN and a TN to which an embodiment of this application is applicable. In FIG. 2, a TN cell 1 and an NTN cell 2 are covered by a base station gNB, and the TN cell 1 and the NTN cell 2 have a same TAC or RANAC. The NTN cell 2 is a cell formed by receiving and forwarding a signal of the base station gNB by a low earth orbit (LEO) satellite, that is, the LEO satellite provides a service coverage area in a transparent form. It may be understood that, an example in which an LEO satellite applies the transparent form is used in FIG. 2. FIG. 2 is not limited to this scenario.

For UE 1 that supports only the TN, the UE 1 can access the TN cell 1 shown in FIG. 2, but cannot access the NTN cell 2 shown in FIG. 2. For UE 2 that can support the TN cell and the NTN cell, the UE 2 may access both the TN cell 1 shown in FIG. 2 and the NTN cell 2 shown in FIG. 2.

It should be noted that the NTN in FIG. 2 is specifically described by using a satellite communication system as an example. However, it should be understood that this is merely an example.

A network architecture and a service scenario described in embodiments of this application are intended to describe the technical solution in embodiments of this application more clearly, and do not constitute a limitation on the technical solution provided in embodiments of this application. A person of ordinary skill in the art may know that with evolution of communication network architectures and emergence of new service scenarios, the technical solution provided in embodiments of this application is also applicable to similar technical problems.

The following explains and describes some terms in embodiments of this application, to help a person skilled in the art have a better understanding.

(1) A terminal device in embodiments of this application is a device having a wireless transceiver function, and may be deployed on land, including an indoor, outdoor, handheld, wearable, or vehicle-mounted device; or may be deployed on a water surface (for example, on a ship); or may be deployed in the air (for example, on a plane, a balloon, or a satellite). The terminal device may communicate with a core network through a radio access network (RAN), and exchange a voice and/or data with the RAN. The terminal device may be a mobile phone, a tablet (Pad), a computer with a wireless transceiver function, a mobile internet device (MID), a wearable device, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in embodiments of this application. The terminal device may also be sometimes referred to as user equipment (UE), a mobile station, a remote station, and the like. A specific technology, a device form, and a name that are used by the terminal device are not limited in embodiments of this application.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

The terminal device in embodiments of this application may alternatively be a vehicle-mounted module, a vehicle-mounted module assembly, a vehicle-mounted component, a vehicle-mounted chip, or a vehicle-mounted unit with which a vehicle is equipped as one or more components or units. The vehicle may use the vehicle-mounted module, the vehicle-mounted module assembly, the vehicle-mounted component, the vehicle-mounted chip, or the vehicle-mounted unit with which the vehicle is equipped to implement the method in this application.

(2) A radio access network device in embodiments of this application is a device that is in a network and that enables a terminal device to access a wireless network. The radio access network device may be a node in a radio access network, which may also be referred to as a base station, or may be referred to as a RAN node. In this application, the radio access network device is a radio access network device deployed on the ground. In the following descriptions, the radio access network device may be referred to as an access network device for short.

The access network device may include an evolved NodeB (NodeB or eNB or e-NodeB) in an LTE system or an evolved LTE system (LTE-Advanced, LTE-A), for example, a conventional macro base station eNB or a micro base station eNB in a heterogeneous network scenario. Alternatively, the access network device may include a next generation NodeB (gNB) in a 5G system or an NR system. Alternatively, the access network device may include a radio network controller (RNC), a NodeB (NB), a base station controller (BSC), a base transceiver station (BTS), a transmission reception point (TRP), a home base station (for example, a home evolved NodeB, or a home NodeB, HNB), a baseband unit (BBU), a baseband pool BBU pool, a wireless fidelity (Wi-Fi) access point (AP), an integrated access and backhaul (IAB) node, or the like. Alternatively, the access network device may include a central unit (CU) and/or a distributed unit (DU) in a cloud radio access network (Cloud RAN) system. This is not limited in embodiments of this application.

For example, in a network structure, the network device may be a CU node, a DU node, or an access network device including the CU node and the DU node. Further, the CU node may be divided into a control plane (CU-CP) and a user plane (CU-UP). The CU-CP is responsible for control plane functions, and mainly includes radio resource control (RRC) and packet data convergence protocol (PDCP)-C. The PDCP-C is mainly responsible for encryption and decryption, integrity protection, data transmission, and the like of control plane data. The CU-UP is responsible for user plane functions, and mainly includes a service data adaptation protocol (SDAP) and a PDCP-U. The SDAP is mainly responsible for processing data of a core network and mapping a flow to a bearer. The PDCP-U is mainly responsible for encryption and decryption, integrity protection, header compression, sequence number maintenance, data transmission, and the like of a data plane. The CU-CP and the CU-UP may be connected through an E1 interface. The CU-CP indicates that the CU is connected to a core network through an Ng interface, and is connected to the DU through an F1-C (control plane) interface. The CU-UP is connected to the DU through an F1-U (the user plane). Certainly, in another possible implementation, the PDCP-C is also in the CU-UP.

(3) A core network device in embodiments of this application is a device in a core network (CN) that provides service support for a terminal device. Currently, examples of some core network devices include an access and mobility management function (AMF) entity, a session management function (SMF) entity, a user plane function (UPF) entity, and the like. The AMF entity is responsible for access management and mobility management of the terminal device. The SMF entity is responsible for session management, for example, user session establishment. The UPF entity is a user plane functional entity, and is mainly responsible for connecting to an external network. It should be noted that an entity in this application may also be a network element or a functional entity. In other words, the AMF entity may also be referred to as an AMF network element or an AMF functional entity, and the SMF entity may also be referred to as an SMF network element or an SMF functional entity. In the following descriptions of this application, the core network device may be an AMF.

(4) A satellite in embodiments of this application is a network device located on a satellite. For ease of description, the network device on the satellite may be referred to as the satellite for short. The satellite may be a low earth orbit (LEO) satellite, a medium earth orbit satellite, a geostationary earth orbit (GEO) satellite, or another network device moving in a high altitude.

Generally, satellites in a satellite communication system can be classified, based on a satellite orbit height, into the following three types: the geostationary earth orbit satellite, the low earth orbit (LEO) satellite, and the medium earth orbit satellite. The geostationary earth orbit satellite may also be referred to as a stationary satellite. A moving speed of the geostationary earth orbit satellite is the same as a rotation speed of the earth. Therefore, the geostationary earth orbit satellite remains in a stationary state relative to the ground. Correspondingly, a satellite cell formed by the geostationary earth orbit satellite is also stationary. The low earth orbit satellite may also be referred to as a near-earth orbit satellite. The low earth orbit satellite moves fast relative to the ground. Therefore, a satellite cell formed by the low earth orbit satellite may move as the satellite moves. A medium earth orbit satellite is a satellite located at a satellite orbit height between a satellite orbit height of the geostationary earth orbit satellite and a satellite orbit height of the low earth orbit satellite.

In a possible implementation, the satellite may receive a signal of a radio access network device and forward the signal to the ground to form a satellite cell, so as to provide service coverage for a terminal device on the ground. In this case, the satellite is equivalent to a relay node or a transponder. Therefore, this scenario may also be referred to as a transparent form of the satellite. In another implementation, the satellite may generate cell information. For example, in this form, the satellite may include a network device with a similar function such as that of a DU, a base station, or an IAB. Therefore, this scenario may be referred to as a regenerative form of the satellite.

(5) It should be noted that the terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Figure 3:
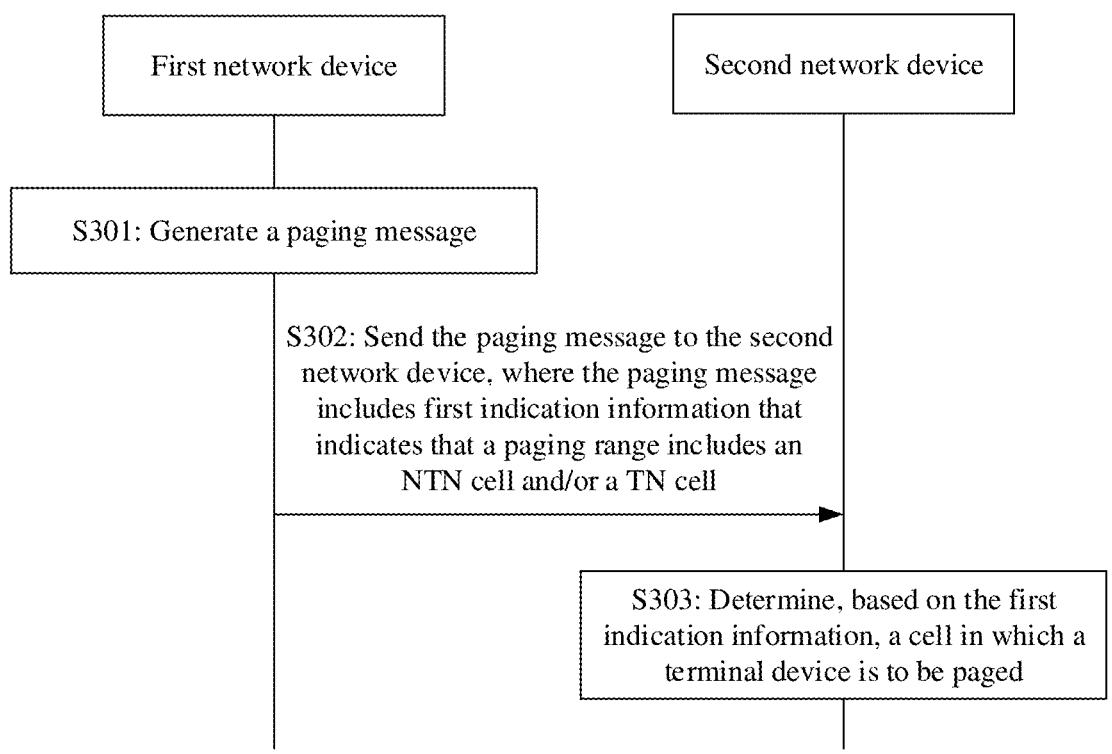
FIG. 3 is a schematic flowchart of a communication method according to an embodiment of this application.

On the basis of the foregoing described system architectures shown in FIG. 1 and FIG. 2, FIG. 3 is a schematic flowchart of a communication method according to an embodiment of this application. The method includes the following steps.

Step S301: A first network device generates a paging message, where the paging message is used to page a terminal device, the paging message includes first indication information, and the first indication information indicates that a paging range includes an NTN cell and/or a TN cell.

The paging range is a sending range of a paging message oriented to the terminal device, and may also be referred to as a paging area range. It may be understood that the first indication information may indicate three possible paging ranges: a paging range including only the NTN cell, a paging range including only the TN cell, and a paging range including the NTN cell and the TN cell.

When the first indication information indicates that the paging range includes only the NTN cell, the first indication information may further indicate that the paging range only includes one or more of a GEO satellite cell, an LEO satellite cell, or an HAPS cell, that is, indicate which type of NTN cell is included in the paging area.

It should be noted that the first indication information may be of a public land mobile network (PLMN) identity (ID) level, to be specific, the first indication information indicates a paging area corresponding to each PLMN ID. Alternatively, the first indication information may be at least one of a tracking area code (TAC) level, a radio access network area code (RANAC) level, a frequency level, or a cell level. This is not limited in this application.

Further, the first indication information may indicate in an implicit manner. For example, the first indication information may be NTN frequency band information. To be specific, when the paging message includes the NTN frequency band information, it indicates that the paging range includes the NTN cell. Alternatively, the first indication information may indicate in an explicit manner. For example, the terminal device may support a TN cell by default. On this basis, the first indication information may be a flag that occupies one bit in the paging message. When a value of the flag is 1, it indicates that the paging range includes the NTN cell, in other words, the paging range includes the NTN cell and the TN cell. When a value of the flag is 0, it indicates that the paging range does not include the NTN cell, in other words, the paging range includes only the TN cell. For another example, the first indication information may be a flag that occupies two bits in the paging message. When a value of the flag is "01", it may indicate that the paging range includes only the TN cell. When a value of the flag is "10", it may indicate that the paging range includes only the NTN cell. When a value of the flag is "11", it may indicate that the paging range includes both the NTN cell and the TN cell. It may be understood that the first indication information may also have another indication manner, which is not listed one by one herein.

Step S302: The first network device sends the paging message to a second network device. Correspondingly, the second network device may receive the paging message from the first network device.

Step S303: The second network device determines, based on the first indication information, a cell in which the terminal device is to be paged.

Specifically, when the first indication information indicates that the paging range includes only the NTN cell, the second network device may determine that the cell in which the terminal device is to be paged is an NTN cell managed by the second network device. Then, to page the terminal device, the second network device may send the paging message only in the NTN cell managed by the second network device, and does not send the paging message in a TN cell managed by the second network device, so as to save paging signaling resources.

When the first indication information indicates that the paging range includes only the TN cell, the second network device may determine that the cell in which the terminal device is to be paged is a TN cell managed by the second network device. Then, to page the terminal device, the second network device may send the paging message only in the TN cell managed by the second network device, and does not send the paging message in an NTN cell managed by the second network device, so as to save paging signaling resources.

When the first indication information indicates that the paging range includes the NTN cell and the TN cell, the second network device may determine that the cells in which the terminal device is to be paged are an NTN cell and a TN cell that are managed by the second network device. Then, the second network device may send the paging message in both the NTN cell and the TN cell that are managed by the second network device, to page the terminal device. Correspondingly, after receiving the paging message, the terminal device may send an RRC connection setup/resume request to the second network device, to access the second network device.

It should be noted that quantities of NTN cells and TN cells that are managed by the second network device are not specifically limited in embodiments of this application. The second network device may manage one or more NTN cells, may manage one or more TN cells, or may manage both one or more NTN cells and one or more TN cells. This is not limited in this application.

Optionally, the first network device may further obtain capability information of the terminal device, where the capability information is used to determine whether the terminal device supports the NTN cell and/or the TN cell. If the terminal device supports the NTN cell, the capability information may be further used to determine that the terminal device supports one or more of the GEO satellite cell, the LEO satellite cell, or the HAPS cell. The capability information may be capability indication information, may be type information of the terminal device, may be frequency information or frequency band information supported by the terminal device, or the like.

In a specific implementation, a manner in which the first network device obtains the capability information of the terminal device may be as follows: The first network device receives the capability information of the terminal device reported by the terminal device. Alternatively, the first network device receives the capability information of the terminal device from another network device. For example, the first network device may receive the capability information of the terminal device sent by a core network device, or the first network device may receive the capability information of the terminal device sent by another access network device. It may be understood that the first network device may alternatively obtain the capability information of the terminal device in another manner. This is not limited in this application.

By applying the foregoing technical solution, the network device may determine an appropriate and accurate paging area based on the type information of the terminal device or the capability information of the terminal device, to avoid sending the paging message in an area that is not supported by the terminal device, so that overheads of paging signaling are effectively reduced.

Figure 4:
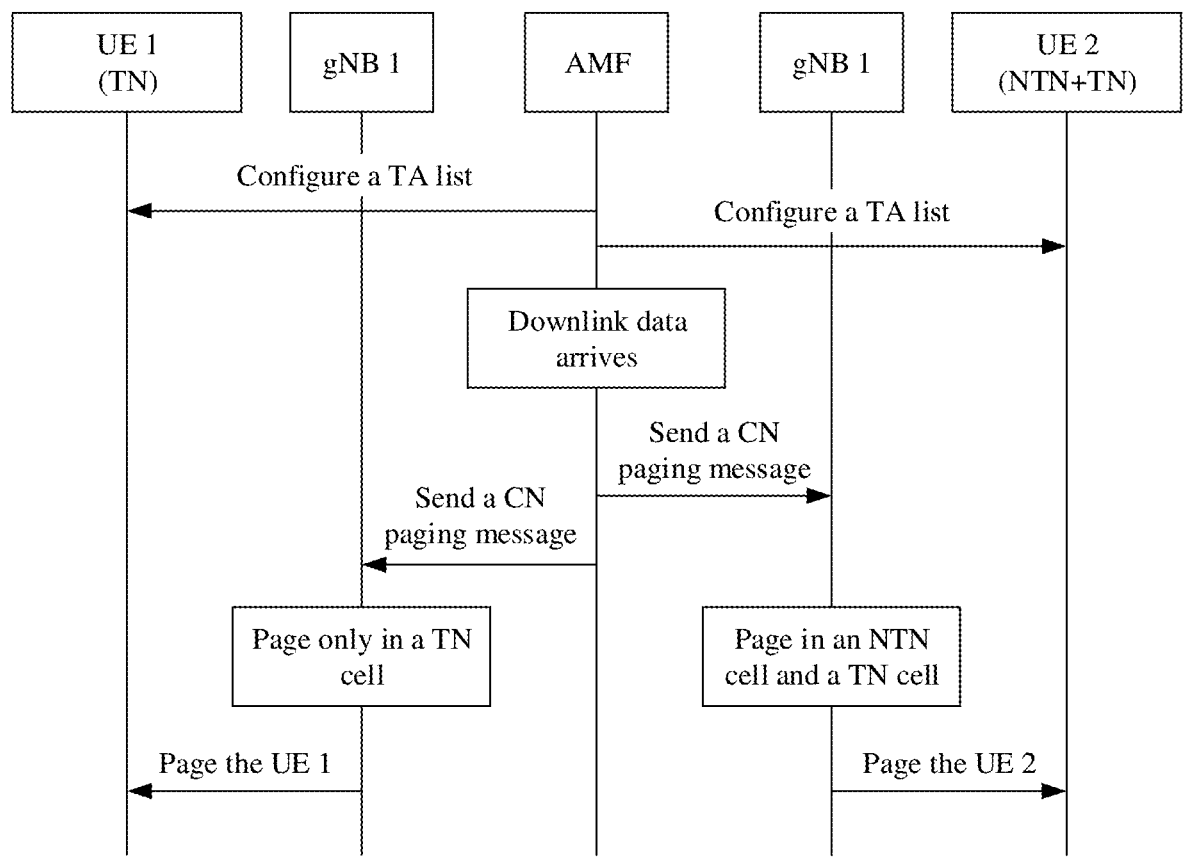
FIG. 4 is a schematic diagram of a scenario in which a core network device initiates paging (that is, CN paging) according to an embodiment of this application.

In a possible implementation, the first network device may be a core network device, and the second network device may be an access network device. As shown in FIG. 4, this implementation corresponds to a scenario in which a terminal device is in an RRC_IDLE mode and a core network device initiates paging (that is, CN paging). In this scenario, the access network device is an access network device that is in TA information of the terminal device. Optionally, the TA information may also be referred to as a TA list, and the TA list may include at least one TAC, or include at least one PLMN ID and at least one TAC corresponding to the PLMN ID.

Specifically, in FIG. 4, the core network device is an AMF, the access network device is a gNB 1. UE 1 supports only a TN cell, and UE 2 may support an NTN cell and a TN cell. Both the UE 1 and the UE 2 are in the RRC_IDLE mode. In this way, when downlink data of the UE 1 arrives, the AMF may send a paging message to each access network device included in a TA list of the UE 1. The paging message is specifically a CN paging message. For example, the AMF sends a paging message to the gNB 1 (to be specific, the gNB 1 herein refers to one access network device that is in TA information of the UE 1) shown in FIG. 4. First indication information in the paging message may indicate that a paging range includes only the TN cell. For example, the first indication information may be a flag that occupies two bits in the paging message. The AMF sets a value of the flag to "01", to indicate that the paging range includes only the TN cell. Further, the gNB 1 may page the UE 1 only in a TN cell managed by the gNB 1. If the UE 1 receives the paging message, the UE 1 may send an RRC connection setup request to the gNB 1, to access the gNB 1.

When downlink data of the UE 2 arrives, the AMF may send the paging message to each access network device included in TA information of the UE 2. The paging message is specifically a CN paging message. For example, the AMF sends a paging message to the gNB 1 (to be specific, the gNB 1 herein refers to one access network device that is in the TA information of the UE 2) shown in FIG. 4. First indication information in the paging message may indicate that a paging range includes the NTN cell and the TN cell. For example, the first indication information may be a flag that occupies two bits in the paging message. The AMF sets a value of the flag to "11", to indicate that the paging range includes the NTN cell and the TN cell. Further, the gNB 1 may page the UE 2 in both an NTN cell and a TN cell that are managed by the gNB 1. If the UE 2 receives the paging message, the UE 2 may send an RRC connection setup request to the gNB 1, to access the gNB 1.

Optionally, before the downlink data of the UE 1 or the UE 2 arrives, the AMF may further separately configure corresponding TA information for the UE 1 and the UE 2. The TA information may also be referred to as a TA list, and may be understood as paging configuration information. The TA list may include at least one TAC, or include at least one PLMN ID and at least one TAC corresponding to the PLMN ID.

Figure 5:
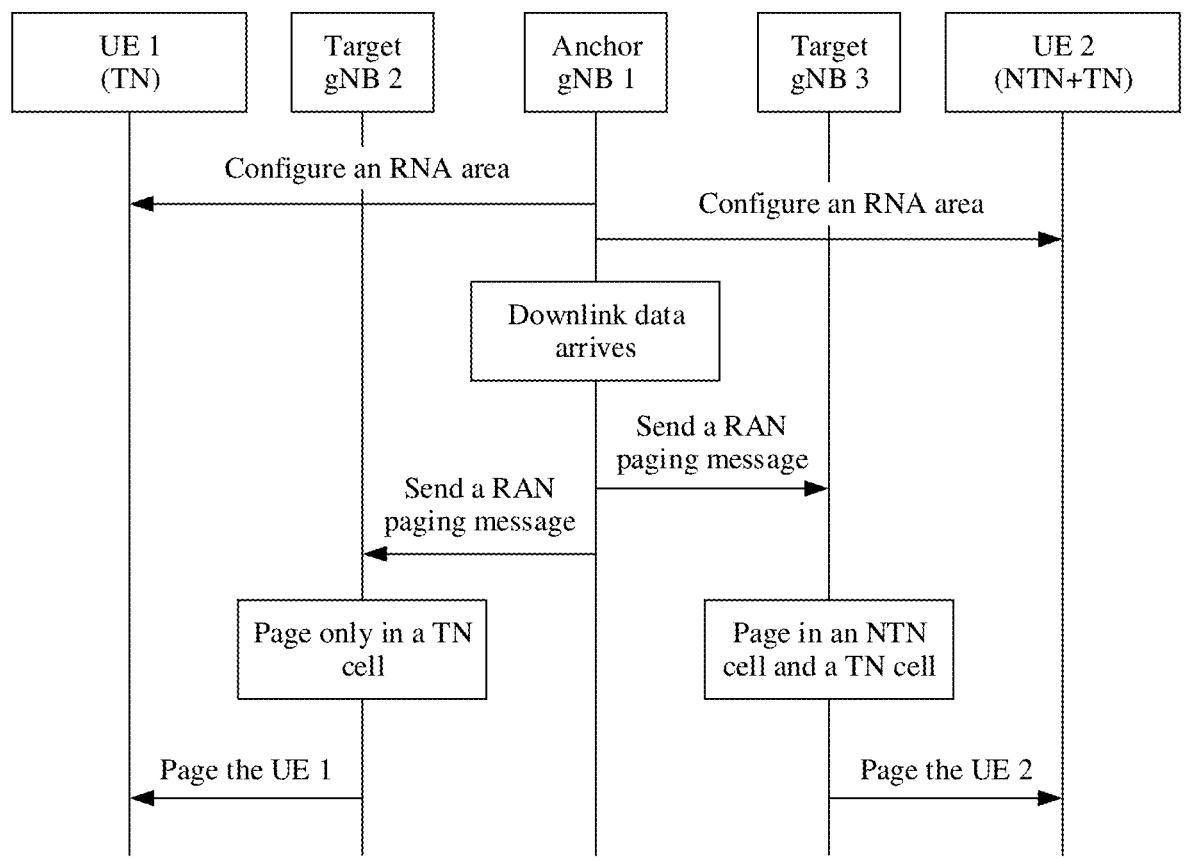
FIG. 5 is a schematic diagram of a scenario in which an access network device initiates paging (that is, RAN paging) according to an embodiment of this application.

In another possible implementation, both a first network device and a second network device may be access network devices. As shown in FIG. 5, this implementation corresponds to a scenario in which a terminal device is in an RRC_INACTIVE mode and an access network device initiates paging (that is, RAN paging). In other words, in this scenario, the first network device may be a first access network device, and the second network device may be a second access network device. It should be noted that the first access network device herein is a serving access network device (namely, a serving node) used before a terminal device enters an RRC_INACTIVE mode from an RRC_CONNECTED (CONNECTED) mode. The serving access network device may also be referred to as an anchor access network device or a source network device of the terminal device. The second access network device is an access network device located in an RNA area of the terminal device.

Specifically, in FIG. 5, both UE 1 and UE 2 are in the RRC_INACTIVE mode. The first access network device is an anchor gNB 1 of the UE 1 and the UE 2. The second access network device is a target gNB 2 or a target gNB 3. The UE 1 supports only a TN cell, and the UE 2 may support an NTN cell and a TN cell. In this way, when downlink data of the UE 1 arrives, a core network device (such as an AMF) may directly send the downlink data to the anchor gNB 1. Further, the anchor gNB 1 may send a paging message to another access network device located in an RNA area of the UE 1. The paging message is specifically a RAN paging message. For example, the anchor gNB 1 sends a paging message to the target gNB 2 (to be specific, the target gNB 2 herein refers to one access network device located in the RNA area of the UE 1) shown in FIG. 5. First indication information in the paging message may indicate that a paging range includes only the TN cell. In this case, the target gNB 2 may page the UE 1 only in a TN cell managed by the target gNB 2. If the UE 1 receives the paging message sent by the target gNB 2, the UE 1 may send an RRC connection resume request to the target gNB 2, to access the target gNB 2. Optionally, the anchor gNB 1 may alternatively page the UE 1 in a TN cell managed by the anchor gNB 1. If the UE 1 receives the paging message sent by the anchor gNB 1, the UE 1 may also send an RRC connection resume request to the anchor gNB 1, to access the anchor gNB 1.

Similarly, when downlink data of the UE 2 arrives, a core network device (such as an AMF) may directly send the downlink data to the anchor gNB 1. Further, the anchor gNB 1 may send a paging message to another access network device located in an RNA area of the UE 2. The paging message is specifically a RAN paging message. For example, the anchor gNB 1 sends a paging message to the target gNB 3 (to be specific, the target gNB 3 herein refers to one access network device located in the RNA area of the UE 2) shown in FIG. 5. First indication information in the paging message may indicate that a paging range includes the NTN cell and the TN cell. In this case, the target gNB 3 may page the UE 2 in an NTN cell and a TN cell that are managed by the target gNB 3. If the UE 2 receives the paging message sent by the target gNB 3, the UE 2 may send an RRC connection resume request to the target gNB 3, to access the target gNB 3. Optionally, the anchor gNB 1 may alternatively page the UE 2 in both an NTN cell and a TN cell that are managed by the anchor gNB 1. If the UE 2 receives the paging message sent by the anchor gNB 1, the UE 2 may also send an RRC connection resume request to the anchor gNB 1, to access the anchor gNB 1.

Optionally, before the downlink data of the UE 1 or the UE 2 arrives, the anchor gNB 1 may further separately configure corresponding RNA information for the UE 1 and the UE 2.

The RNA information may also be referred to as RNA area information or an RNA area, and may be understood as paging configuration information.

It should be noted that the target gNB 2 shown in FIG. 5 is a gNB in the RNA area corresponding to the UE 1, and the target gNB 3 is a gNB in the RNA area corresponding to the UE 2. Names of the target gNB 2 and the target gNB 3 are merely used as examples. The target gNB 2 and the target gNB 3 may be a same gNB, or may be different gNBs. This is not limited in this application.

Optionally, in this embodiment of this application, the first network device may further send second indication information to the terminal device, where the second indication information indicates that an area range to which the paging configuration information is applicable includes the NTN cell and/or the TN cell. The paging configuration information may include TA information or RNA information. Specifically, for UE in the RRC_IDLE mode, the first network device is a core network device, and the paging configuration information of the first network device is the TA information. For UE in the RRC_INACTIVE mode, the first network device is an access network device, and the paging configuration information of the first network device is the RNA information.

Further, when the second indication information indicates that the area range to which the paging configuration information is applicable includes the NTN cell, the second indication information may further indicate that the area range to which the paging configuration information is applicable includes one or more of the GEO satellite cell, the LEO satellite cell, or the HAPS cell. Similarly, the second indication information may be at least one of a PLMN ID level, a TAC level, a RANAC level, a frequency level, or a cell level. This is not limited in this application.

It can be learned that by using a corresponding area range to which the paging configuration information is applicable and that is configured by the network device for the terminal device, when the terminal device moves out of the area range to which the paging configuration information is applicable, the terminal device may trigger tracking area update (TAU) or radio access network-based notification area update (RNAU) in a timely manner, so that the network device can learn of location information of the terminal device in a timely manner and perform corresponding location management.

Optionally, when both the first network device and the second network device are access network devices, that is, in the RAN paging scenario, and the terminal device is in the RRC_INACTIVE mode, the first network device may further receive a context request message from the second network device, where the context request message is used to request a context of the terminal device, the first network device is an anchor access network device of the terminal device, and the second network device is another access network device that finds the terminal device through paging. Correspondingly, the first network device sends a context response message to the second network device, where the context response message includes at least one of the context of the terminal device, the capability information of the terminal device, or the paging configuration information of the terminal device. The capability information of the terminal device is used to determine whether the terminal device supports the NTN cell and/or the TN cell. The capability information of the terminal device may be further used to determine that the terminal device supports one or more of the GEO satellite cell, the LEO satellite cell, or the HAPS cell. Optionally, the context response message may further include the first indication information and/or the second indication information described above in this application.

Figure 6:
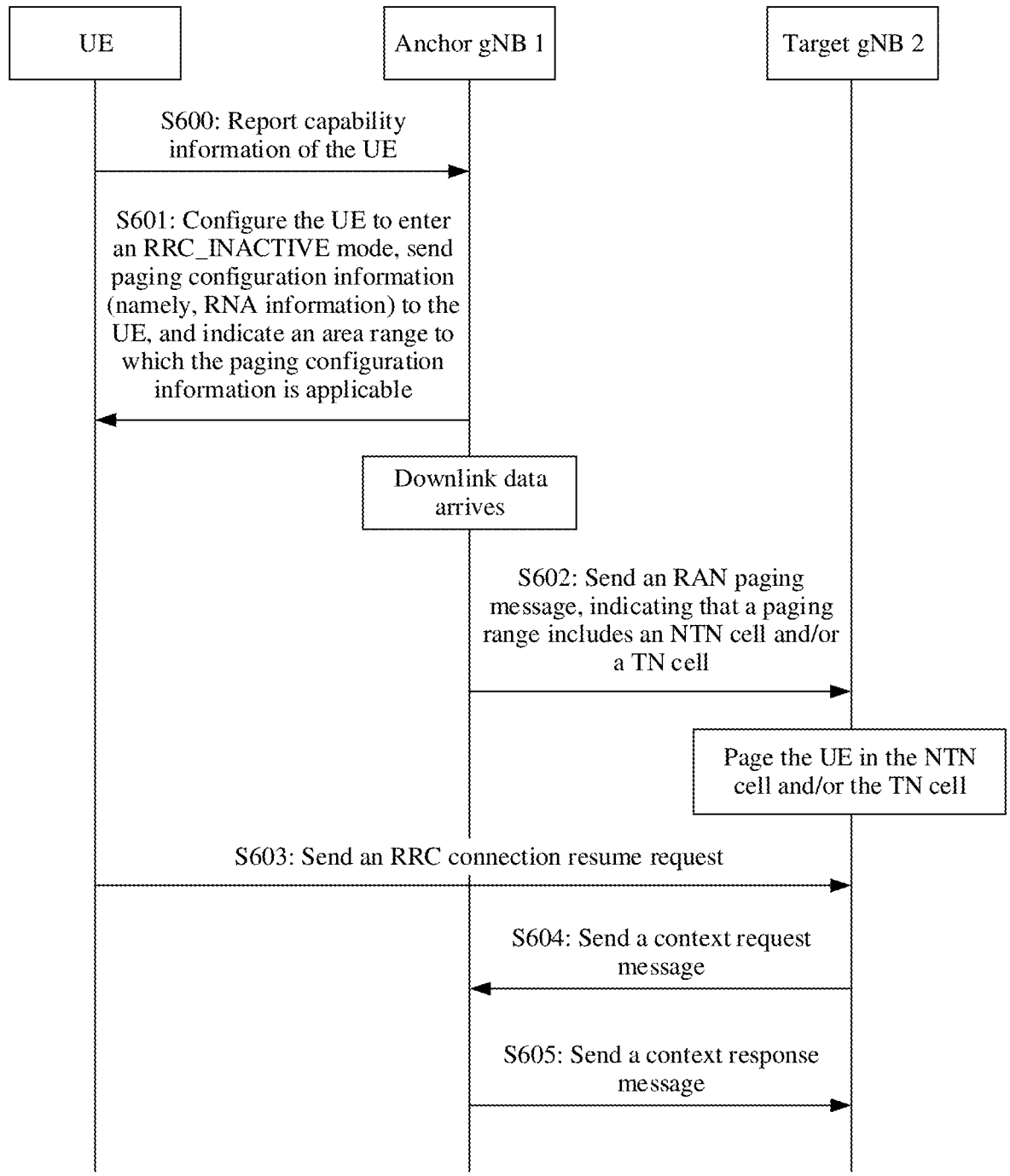
FIG. 6 is a schematic diagram of a specific example according to an embodiment of this application.

FIG. 6 is a specific example of a communication method provided in an embodiment of this application. When a scenario of the example is a RAN paging scenario, that is, UE is in an RRC_INACTIVE mode, an anchor gNB 1 is a gNB that the UE last accesses before the UE enters the RRC_INACTIVE mode from an RRC_CONNECTED mode, and the target gNB 2 is a gNB that finds the UE through paging in an RNA of the UE.

Specifically, in step S600, the UE may report capability information of the UE to the anchor gNB 1, to notify the anchor gNB 1 that the UE supports an NTN cell and a TN cell.

In step S601, the anchor gNB 1 may configure the UE to enter the RRC_INACTIVE mode, and send paging configuration information to the UE. Optionally, the anchor gNB 1 may further indicate an area range to which the paging configuration information is applicable. The paging configuration information is specifically RNA information, and the area range to which the paging configuration information is applicable may include the NTN cell and/or the TN cell.

Optionally, the terminal device may consider by default that the RNA information includes the NTN cell and the TN cell. Alternatively, the anchor gNB 1 may further send second indication information to the UE. The second indication information indicates that the area range to which the RNA information is applicable includes only the NTN cell, only the TN cell, or both the NTN cell and the TN cell. In this specific example, an example in which the second indication information indicates that the area range to which the paging configuration information is applicable includes only the NTN cell is used. In this way, when the UE moves out of the range of the NTN cell indicated in the configured RNA information, the terminal device may perform an RNAU process.

In step S602, when downlink data of the UE arrives, the anchor gNB 1 may send a paging message to the target gNB 2, where the paging message includes first indication information, to indicate that a paging range includes only the NTN cell, and the paging message is specifically a RAN paging message. It should be noted that the target gNB 2 herein is one gNB in an RNA area corresponding to the UE. However, it should be understood that when the downlink data of the UE arrives, the anchor gNB 1 may send the paging message to each gNB in the RNA area corresponding to the UE.

Subsequently, the target gNB 2 may also page the UE in an NTN cell managed by the target gNB 2.

In step S603, after the target gNB 2 finds the UE through paging, the UE may send an RRC connection resume request to the target gNB 2, to request to resume an RRC connection and enter the RRC_CONNECTED mode.

In step S604, the target gNB 2 may send a context request message to the anchor gNB 1, to request a context of the UE.

In step S605, the anchor gNB 1 may send a context response message to the target gNB 2, where the context response message includes the context of the UE and one or more of information such as the capability information of the UE, the RNA information of the UE, the first indication information, or the second indication information.

Figure 7:
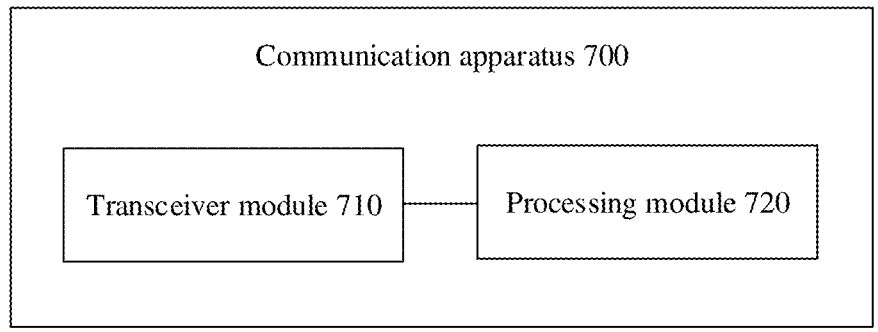
FIG. 7 is a schematic diagram of a structure of a communication apparatus according to an embodiment of this application.

An embodiment of this application further provides a communication apparatus. FIG. 7 is a schematic diagram of a structure of a communication apparatus according to this embodiment of this application. The communication apparatus 700 includes a transceiver module 710 and a processing module 720. The communication apparatus may be configured to implement functions of a network device (for example, a first network device or a second network device) in any one of the foregoing method embodiments. For example, the communication apparatus may be a network device or a chip or a circuit included in a network device.

For example, when the communication apparatus performs operations or steps corresponding to the first network device in the method embodiment shown in FIG. 3, the processing module 720 is configured to generate a paging message, where the paging message is used to page a terminal device, the paging message includes first indication information, and the first indication information indicates that a paging range includes a non-terrestrial network NTN cell and/or a terrestrial network TN cell; and the transceiver module 710 is configured to send the paging message to a second network device.

In a possible design, when the first indication information indicates that the paging range includes the NTN cell, the first indication information may further indicate that the paging range includes one or more of a geostationary earth orbit GEO satellite cell, a low earth orbit LEO satellite cell, or a high altitude platform station HAPS cell.

In a possible design, the transceiver module 710 is further configured to obtain capability information of the terminal device, where the capability information is used to determine whether the terminal device supports the NTN cell and/or the TN cell.

In a possible design, if the terminal device supports the NTN cell, the capability information may be further used to determine that the terminal device supports one or more of the GEO satellite cell, the LEO satellite cell, or the HAPS cell.

In a possible design, the transceiver module 710 is further configured to send second indication information to the terminal device, where the second indication information indicates that an area range to which paging configuration information is applicable includes the NTN cell and/or the TN cell. The paging configuration information may be tracking area TA information or radio access network notification RNA information.

In a possible design, when the first indication information indicates that the area range to which the paging configuration information is applicable includes the NTN cell, the second indication information may further indicate that the area range to which the paging configuration information is applicable includes one or more of the GEO satellite cell, the LEO satellite cell, or the HAPS cell.

In a possible design, the communication apparatus may be a core network device, and a second network device may be an access network device. Alternatively, both the communication apparatus and the second network device may be access network devices.

In a possible design, if both the communication apparatus and the second network device are access network devices, the transceiver module 710 is further configured to receive a context request message from the second network device, where the context request message is used to request a context of the terminal device. The transceiver module 710 is further configured to send a context response message to the second network device, where the context response message includes the capability information of the terminal device. The communication apparatus is an anchor access network device of the terminal device, and the second network device is another access network device that finds the terminal device through paging.

When the communication apparatus performs operations or steps corresponding to the second network device in the method embodiment shown in FIG. 3, the transceiver module 710 is configured to receive a paging message from the first network device, where the paging message is used to page the terminal device, the paging message includes the first indication information, and the first indication information indicates that the paging range includes a non-terrestrial network NTN cell and/or a terrestrial network TN cell; and the processing module 720 is configured to determine, based on the first indication information, a cell in which the terminal device is to be paged.

In a possible design, when the first indication information indicates that the paging range includes the NTN cell, the first indication information may further indicate that the paging range includes one or more of the geostationary earth orbit GEO satellite cell, the low earth orbit LEO satellite cell, or the high altitude platform station HAPS cell.

In a possible design, the first network device may be a core network device, and the communication apparatus may be an access network device. Alternatively, both the first network device and the communication apparatus may be access network devices.

In a possible design, if both the first network device and the communication apparatus are access network devices, the transceiver module 710 is further configured to send the context request message to the first network device, where the context request message is used to request a context of the terminal device. The transceiver module 710 is further configured to receive the context response message from the first network device, where the context response message includes the capability information of the terminal device. The first network device is the anchor access network device of the terminal device, and the communication apparatus is another access network device that finds the terminal device through paging.

The processing module 720 in the communication apparatus may be implemented by at least one processor or one processor-related circuit component. The transceiver module 710 may be implemented by at least one transceiver, one transceiver-related circuit component, or one communication interface. Operations and/or functions of the modules in the communication apparatus are separately used to implement corresponding procedures of the method shown in FIG. 3, FIG. 4, FIG. 5, or FIG. 6. For brevity, details are not described herein again. Optionally, the communication apparatus may further include a storage module. The storage module may be configured to store data and/or instructions. The transceiver module 710 and/or the processing module 720 may read the data and/or the instructions in the storage module, so that the communication apparatus implements the corresponding method. The storage module may be implemented, for example, by using at least one memory.

The storage module, the processing module, and the transceiver module may exist separately, or all or some of the modules may be integrated. For example, the storage module and the processing module are integrated, or the processing module and the transceiver module are integrated.

Figure 8:
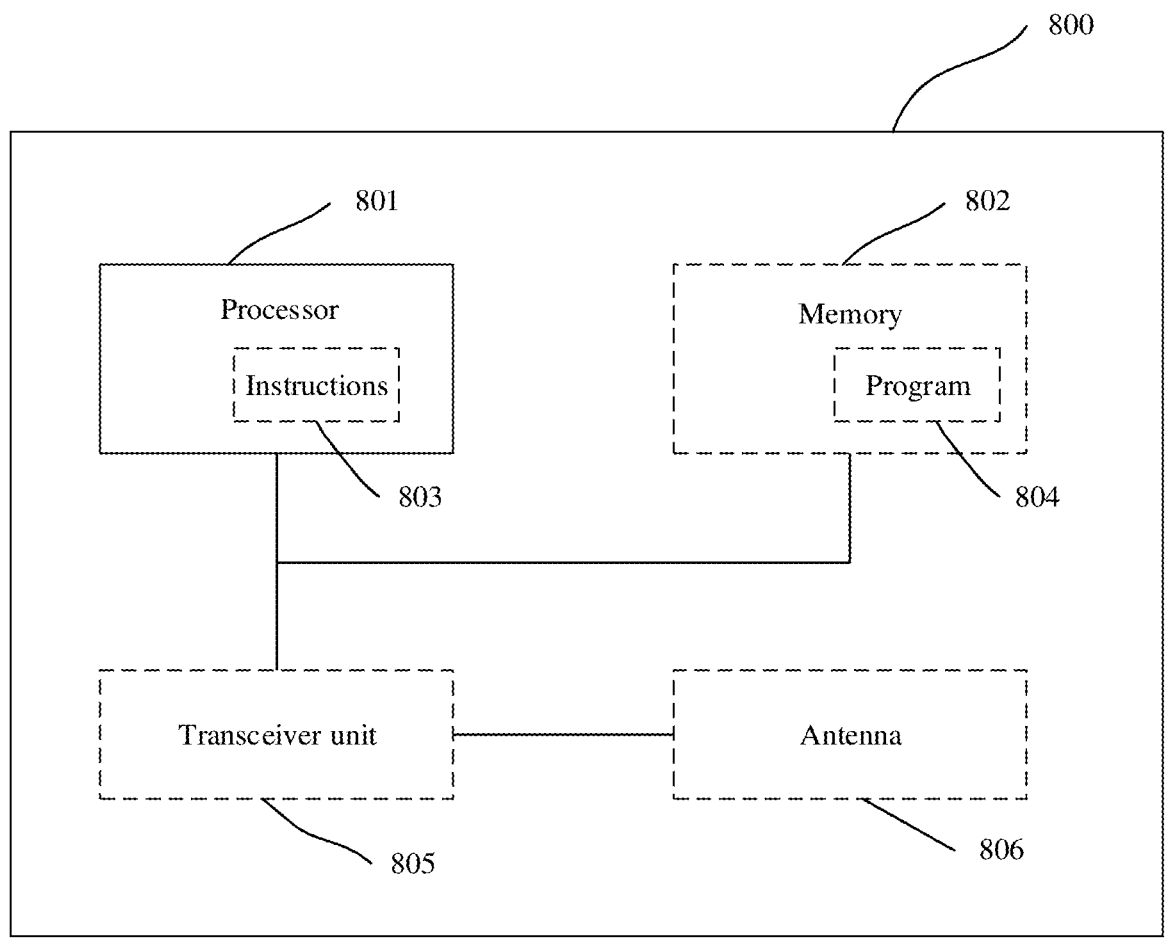
FIG. 8 is another schematic diagram of a structure of a communication apparatus according to an embodiment of this application.

FIG. 8 is another schematic diagram of a structure of a communication apparatus according to an embodiment of this application. A communication apparatus 800 may be configured to implement functions related to the network device in the foregoing method embodiments. For example, when the first network device in the foregoing method embodiments is a core network device, and the second network device is an access network device, the communication apparatus may be configured to implement functions of the first network device. The communication apparatus 800 may be a core network device, or may be configured at a chip or a circuit in a core network device.

The communication apparatus 800 includes one or more processors 801. The one or more processors 801 may support the communication apparatus 800 in implementing the method performed by the first network device in the foregoing method embodiments. The processor 801 may be a general-purpose processor or a dedicated processor. For example, the processor 801 may be a central processing unit (CPU) or a baseband processor. The baseband processor may be configured to process communication data. The CPU may be configured to control the communication apparatus (for example, the first network device or the chip), execute a software program, or process data of the software program. The communication apparatus 800 may further include a transceiver unit 805, configured to implement signal input (receiving) and signal output (sending).

For example, the communication apparatus 800 may be a chip, and the transceiver unit 805 may be an input and/or output circuit of the chip. Alternatively, the transceiver unit 805 may be a communication interface of the chip, and the chip may be used as a component of a network device or another wireless communication device.

The communication apparatus 800 may include one or more memories 802. The memory 802 stores a program 804. The program 804 may be run by the processor 801 to generate instructions 803, so that the processor 801 performs, based on the instructions 803, the method described in the foregoing method embodiments. Optionally, the memory 802 may further store data. Optionally, the processor 1301 may further read the data stored in the memory 802. The data and the program 804 may be stored at a same storage address, or the data and the program 804 may be stored at different storage addresses.

The processor 801 and the memory 802 may be disposed separately, or may be integrated together, for example, integrated on a board or a system-on-a-chip (SoC).

The communication apparatus 800 may further include a transceiver unit 805 and an antenna 806. The transceiver unit 805 may be referred to as a transceiver machine, a transceiver circuit, or a transceiver, and is configured to implement a transceiver function of the communication apparatus via the antenna 806.

Figure 9:
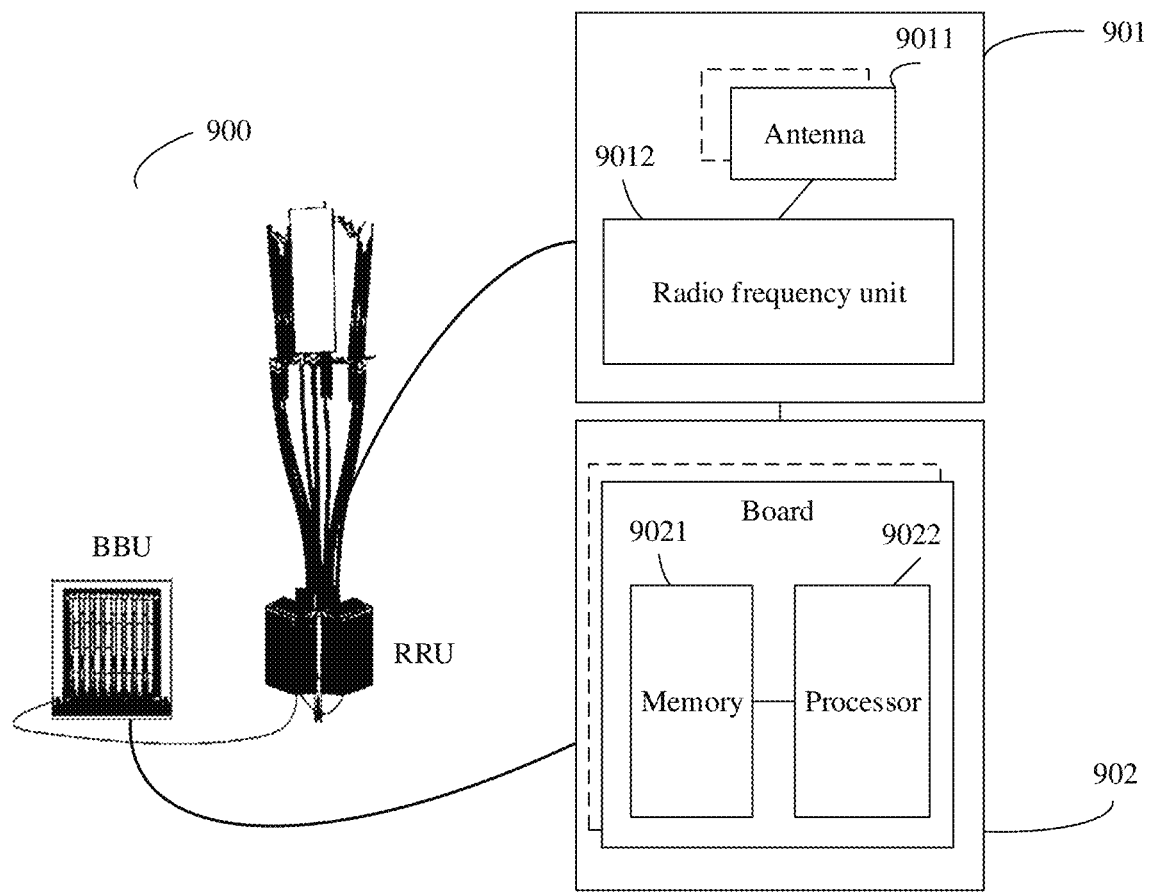
FIG. 9 is still another schematic diagram of a structure of a communication apparatus according to an embodiment of this application.

FIG. 9 is still another schematic diagram of a structure of a communication apparatus according to an embodiment of this application. The communication apparatus may be specifically an access network device such as a base station, configured to implement functions related to the network device in any one of the foregoing method embodiments. For example, when the first network device in the foregoing method embodiments is a core network device, and the second network device is an access network device, the communication apparatus may be configured to implement functions of the second network device. Alternatively, when both the first network device and the second network device in the foregoing method embodiments are access network devices, the communication apparatus may be configured to implement functions of the first network device or the second network device.

The network device 900 includes one or more radio frequency units, for example, one or more remote radio units (RRUs) 901, and one or more baseband units (BBUs) (which may also be referred to as digital units (DUs)) 902. The RRU 901 may be referred to as a transceiver unit, a transceiver, a transceiver circuit, a transceiver, or the like, and the RRU 901 may include at least one antenna 9011 and at least one radio frequency unit 9012. The RRU 901 is mainly configured to send and receive radio frequency signals and perform conversion between a radio frequency signal and a baseband signal. The BBU 902 is mainly configured to: perform baseband processing, control the base station, and so on. The RRU 901 and the BBU 902 may be physically disposed together, or may be physically separated, that is, the base station is a distributed base station.

The BBU 902 is a control center of the base station, may also be referred to as a processing unit, and is mainly configured to complete a baseband processing function such as channel coding, multiplexing, modulation, or spreading. For example, the BBU (the processing unit) 902 may be configured to control the base station to perform an operation procedure for the network device in the foregoing method embodiments.

In an example, the BBU 902 may include one or more boards, and the boards may jointly support a radio access network (for example, an LTE network) having a single access standard, or may separately support radio access networks (for example, the LTE network, a 5G network, or another network) having different access standards. The BBU 902 may further include a memory 9021 and a processor 9022. The memory 9021 is configured to store necessary instructions and data. The processor 9022 is configured to control the base station to perform a necessary action, for example, is configured to control the base station to perform a sending operation in the foregoing method embodiments. The memory 9021 and the processor 9022 may serve one or more boards. In other words, a memory and a processor may be disposed on each board. Alternatively, a plurality of boards may share a same memory and a same processor. In addition, a necessary circuit may further be disposed on each board.

An embodiment of this application further provides a chip system, including a processor. The processor is coupled to a memory. The memory is configured to store a program or instructions. When the program or the instructions are executed by the processor, the chip system is enabled to implement the method corresponding to the terminal device or the method corresponding to the network device in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be separate from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a SoC, a CPU, a network processor (NP), a digital signal processor (DSP), a microcontroller (micro controller unit, MCU), a programmable controller (programmable logic device, PLD), or another integrated chip.

It should be understood that steps in the foregoing method embodiments may be implemented by using a hardware integrated logic circuit or instructions in a software form in the processor. The steps of the methods disclosed with reference to embodiments of this application may be directly performed by a hardware processor, or may be performed by a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a first network device, a second network device, and at least one terminal device. Optionally, the communication system may further include a core network device. The first network device, the second network device, and the terminal device that are included in the communication system may cooperate with each other, to implement any one of the foregoing method embodiments. In addition, for specific implementations of the first network device and the second network device included in the communication system, refer to the foregoing related descriptions of the communication apparatus in FIG. 7, FIG. 8, and FIG. 9.

It should be understood that, the processor in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), or a direct rambus random access memory (direct rambus RAM, DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that numbers in various embodiments of this application are merely used for differentiation for ease of description. Sequence numbers of the foregoing processes or steps do not mean execution sequences. The execution sequences of the processes or steps should be determined based on functions and internal logic of the processes or steps, and should not constitute any limitation on the implementation processes of embodiments of the present invention.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solution of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solution of this application essentially, or the part contributing to the conventional technology, or some of the technical solution may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
   generating, by a first network device, a paging message, wherein
      the paging message is usable to page a terminal device,
      the paging message comprises first indication information, and
      the first indication information indicates that a paging range comprises
         a non-terrestrial network (NTN) cell, or
         a terrestrial network (TN) cell, or
         both the NTN cell and the TN cell; and
   sending, by the first network device, the paging message to a second network device,
   wherein the method further comprises:
   obtaining, by the first network device, capability information of the terminal device, wherein the capability information is usable to determine whether the terminal device supports
      the NTN cell, or the TN cell, or
both the NTN cell and the TN cell.

2. The method according to claim 1, wherein
the first indication information indicates that the paging range comprises the NTN cell, and
the first indication information further indicates that the paging range comprises at least one of a geostationary earth orbit (GEO) satellite cell, a low earth orbit (LEO) satellite cell, or a high altitude platform station (HAPS) cell.

3. The method according to claim 1, wherein
in response to the terminal device supporting the NTN cell, the capability information is further usable to determine that the terminal device supports at least one of a geostationary earth orbit (GEO) satellite cell, a low earth orbit (LEO) satellite cell, or a high altitude platform station (HAPS) cell.

4. The method according to claim 1, wherein
the first network device is a core network device, and the second network device is an access network device; or
both the first network device and the second network device are access network devices.

5. The method according to claim 1, wherein
the first network device is an anchor access network device of the terminal device,
the second network device is another access network device that finds the terminal device through paging, and
the method further comprises:
  receiving, by the first network device, a context request message from the second network device, wherein the context request message requests a context of the terminal device; and
  sending, by the first network device, a context response message to the second network device, wherein the context response message comprises the capability information of the terminal device.

6. A communication method, wherein the method comprises:
  receiving, by a second network device, a paging message from a first network device, wherein
    the paging message is usable to page a terminal device,
    the paging message comprises first indication information, and
    the first indication information indicates that a paging range comprises
      a non-terrestrial network (NTN) cell, or
      a terrestrial network (TN) cell, or
      both the NTN cell and the TN cell; and
  determining, by the second network device based on the first indication information, a cell in which the terminal device is to be paged,
  wherein the method further comprises:
  sending, by the second network device, a context request message to the first network device, wherein the context request message requests a context of the terminal device; and
  receiving, by the second network device, a context response message from the first network device, wherein the context response message comprises capability information of the terminal device.

7. The method according to claim 6, wherein
the first indication information indicates that the paging range comprises the NTN cell, and
the first indication information further indicates that the paging range comprises at least one of a geostationary earth orbit (GEO) satellite cell, a low earth orbit (LEO) satellite cell, or a high altitude platform station (HAPS) cell.

8. The method according to claim 6, wherein
the first network device is a core network device, and the second network device is an access network device; or
both the first network device and the second network device are access network devices.

9. The method according to claim 6, wherein
the first network device is an anchor network device of the terminal device,
the second network device is another access network device that finds the terminal device through paging.

10. The method according to claim 6, wherein
the capability information is usable to determine whether the terminal device supports
  the NTN cell, or
  the TN cell, or
  both the NTN cell and the TN cell.

11. A communication system, comprising a first network device and a second network device, wherein:
  the first network device is configured to generate a paging message and send the paging message to the second network device, wherein
    the paging message is usable to page a terminal device,
    the paging message comprises first indication information, and
    the first indication information indicates that a paging range comprises
      a non-terrestrial network (NTN) cell, or
      a terrestrial network (TN) cell, or
      both the NTN cell and the TN cell;
  the second network device is configured to receive the paging message from the first network device and determine, based on the first indication information, a cell in which the terminal device is to be paged; and
  the first network device is further configured to obtain capability information of the terminal device, wherein the capability information is usable to determine whether the terminal device supports
    the NTN cell, or
    the TN cell, or
    both the NTN cell and the TN cell.

12. The system according to claim 11, wherein
the first indication information indicates that the paging range comprises the NTN cell, and
the first indication information further indicates that the paging range comprises at least one of a geostationary earth orbit (GEO) satellite cell, a low earth orbit (LEO) satellite cell, or a high altitude platform station (HAPS) cell.

13. The system according to claim 11, wherein
in response to the terminal device supporting the NTN cell, the capability information is further usable to determine that the terminal device supports at least one of a geostationary earth orbit (GEO) satellite cell, a low earth orbit (LEO) satellite cell, or a high altitude platform station (HAPS) cell.

14. The system according to claim 11, wherein
the first network device is a core network device, and the second network device is an access network device; or
both the first network device and the second network device are access network devices.

15. The system according to claim 11, wherein
the first network device is an anchor access network device of the terminal device, the second network device is another access network device configured to find the terminal device through paging, and the first network device is further configured to:
    receive a context request message from the second network device, wherein the context request message requests a context of the terminal device; and
    send a context response message to the second network device, wherein the context response message comprises the capability information of the terminal device.

\* \* \* \* \*